April 15, 1969      J. F. KLOUDA      3,438,180
AIR-CLEANING APPARATUS
Filed Dec. 28, 1965
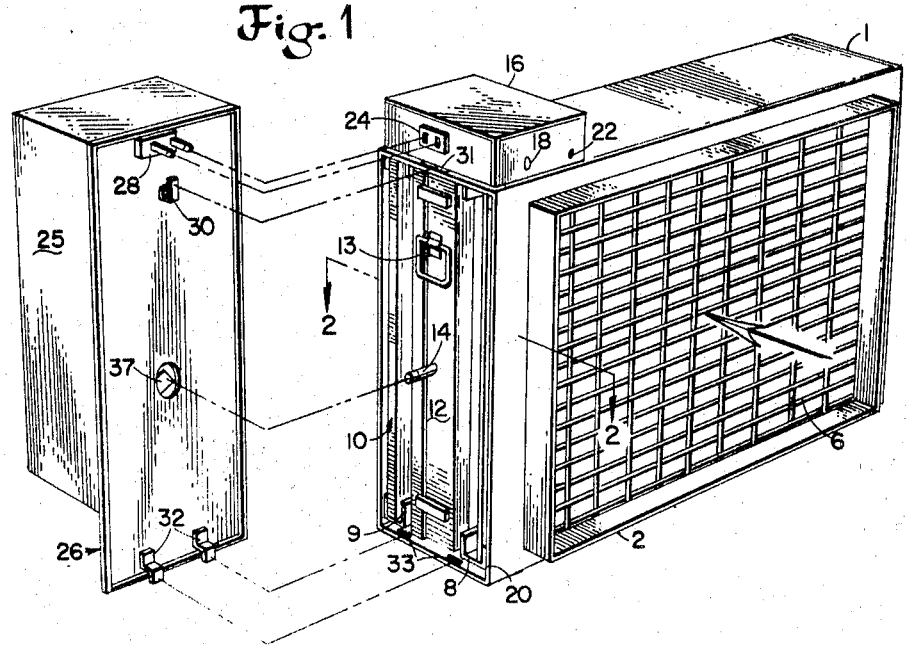
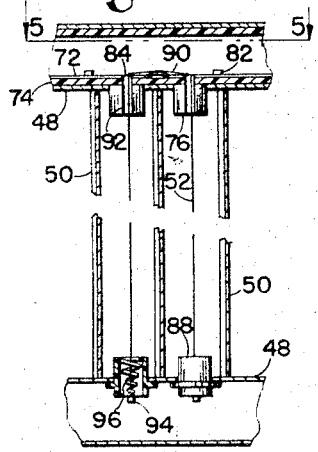
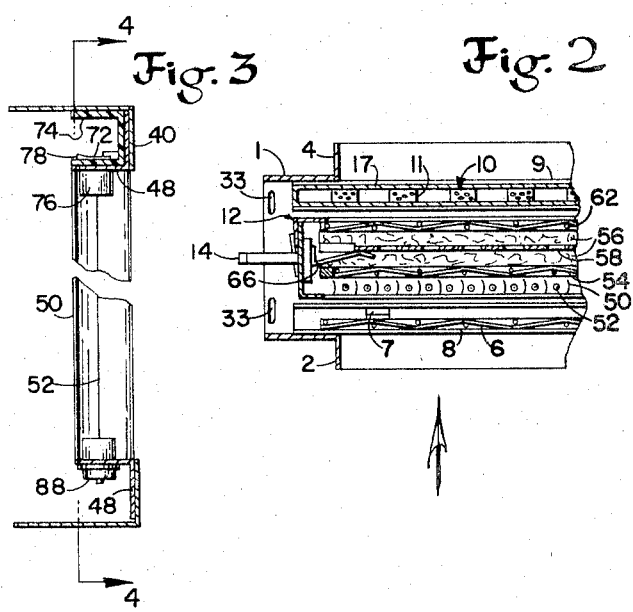
INVENTOR.
JOHN F. KLOUDA
BY *Holmes & Andersen*
ATTORNEYS

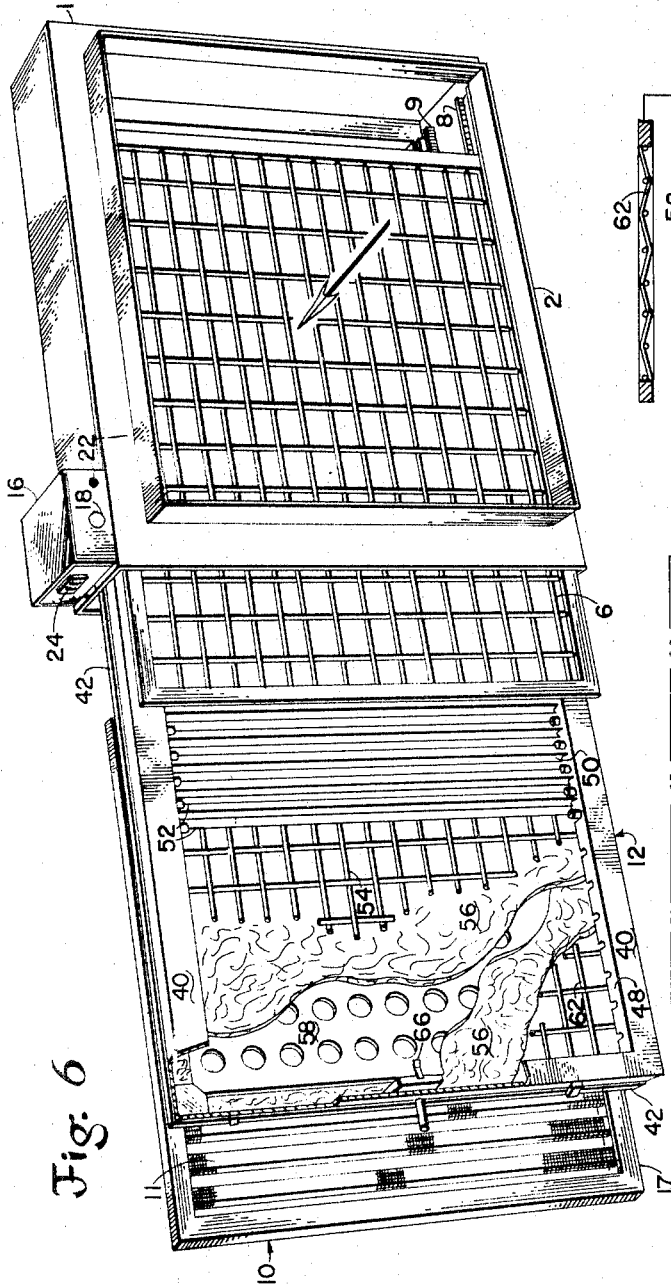
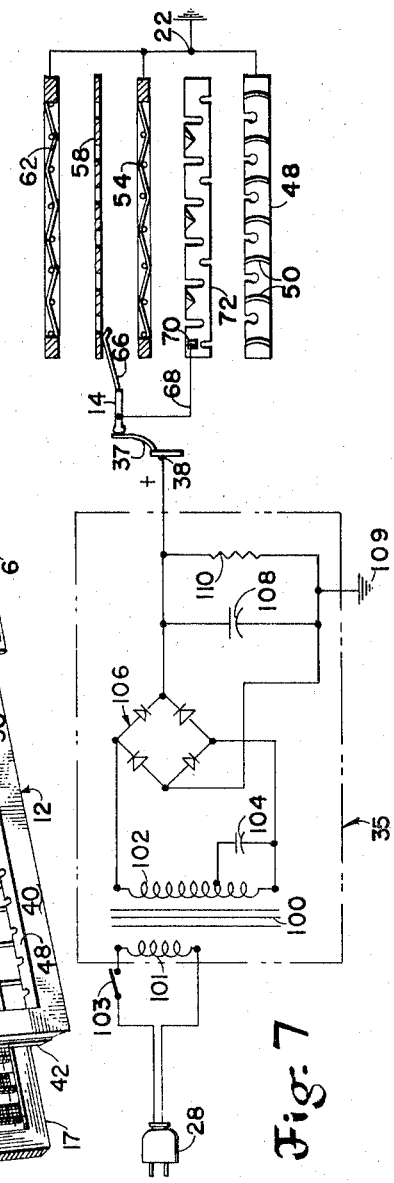

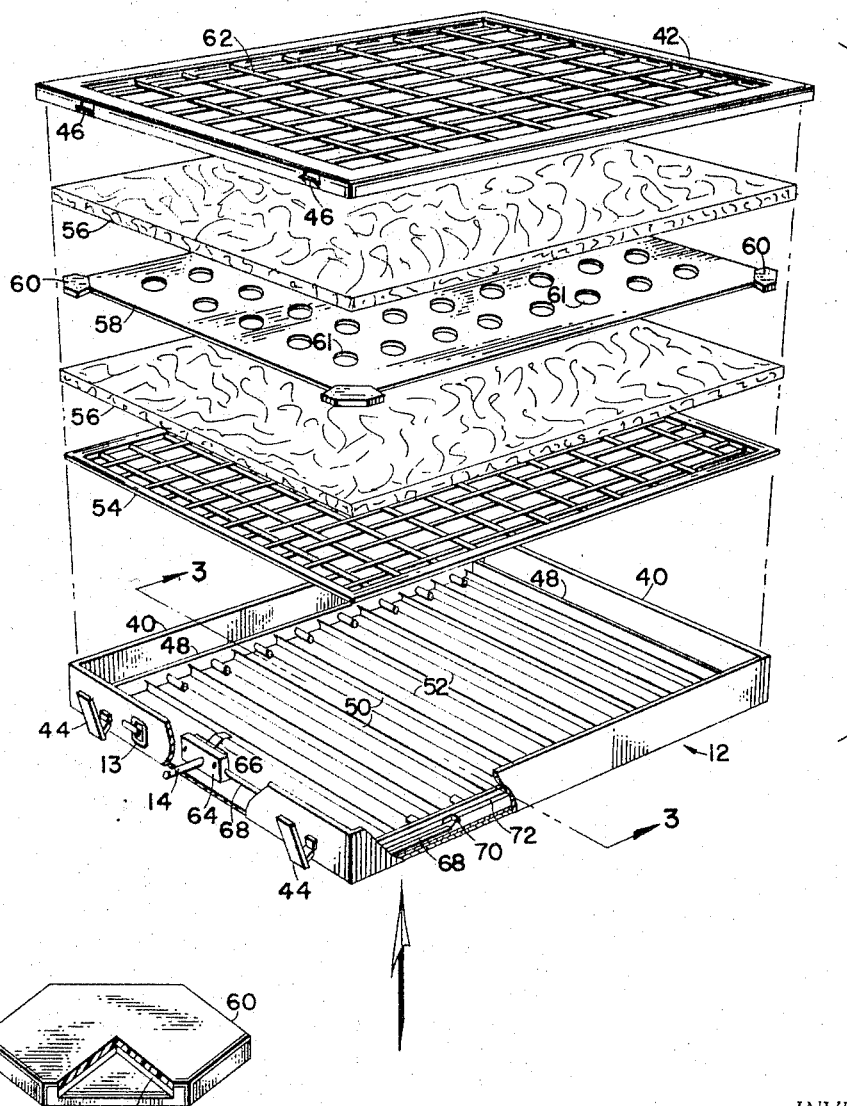
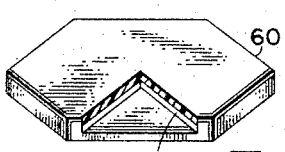
Fig. 9

April 15, 1969          J. F. KLOUDA          3,438,180
AIR-CLEANING APPARATUS

Filed Dec. 28, 1965                                Sheet 4 of 4

INVENTOR.
JOHN F. KLOUDA
BY *Holmes & Andersen*
ATTORNEYS

United States Patent Office 3,438,180
Patented Apr. 15, 1969

3,438,180
AIR-CLEANING APPARATUS
John F. Klouda, La Crosse, Wis., assignor to The Trane Company, La Crosse, Wis., a corporation of Wisconsin
Filed Dec. 28, 1965, Ser. No. 516,918
Int. Cl. B03c 3/34
U.S. Cl. 55—126
2 Claims

ABSTRACT OF THE DISCLOSURE

An electrostatic air filter having a protective screen, a filter cell and a charcoal pack slidably mounted within a housing and adapted for repositioning for flow of air in either direction. For a change in direction of flow the protective screen and the charcoal pack are interchanged in position and the filter cell is inverted. The electrical conductor for the filter cell is in the center of one end of the cell so that it engages the contact on the power source in either of its above mentioned positions.

---

One of the principal obstacles to the acceptance of electrostatic air filters in the small commercial and residential markets has been the lack of a quick and inexpensive means for reconditioning such filters for further use after they have become saturated with foreign particles. Where units incorporating plate-type collector electrodes have been employed, the owner or operator has had to perform the cumbersome and time consuming task of removing the unit and washing the plates. Units employing a replaceable filter medium have not been designed for easy assembly and disassembly, and in some cases have necessitated the disposal of some relatively expensive part of the collecting cell along with the filter medium. Such units have also suffered from the disadvantage of having no installation flexibility as a result of the requirement that air could flow through them in only one direction. Furthermore, electrostatic air filters have conventionally incorporated an ionizing zone comprising a plurality of spaced apart wires, each of which is connected at one end to a high voltage bus strip in a costly and tedious manner.

Accordingly, this invention has as a primary object the provision of an electrostatic air filter cell capable of being readily disassembled for the quick removal and replacement of inexpensive filter media contained therein.

A further object is to provide an electrostatic filter cell as in the preceding object wherein the filter cell comprises an ionizing zone and a collecting zone, with the collecting zone consisting of spaced apart low voltage or ground electrodes, a high voltage electrode positioned therebetween, and removable filter media in the spaces between said high voltage electrode and said low voltage or ground electrodes.

A third object of my invention is to construct an electrostatic air filter ionizing zone having a plurality of ionizing wires connected to a high voltage bus strip by an intermediate portion of each of the wires which is looped over the bus strip in electrical contact therewith.

Another object is to provide air cleaning apparatus having a protective screen, electrostatic filter cell and charcoal deodorizing pack removably retained within a housing, the protective screen and charcoal pack being adapted to be interchangeably positioned at the inlet and outlet of the housing so as to permit the reversal of air flow through the housing.

A fifth object of the invention is to provide air cleaning apparatus as in the preceding object wherein the electrostatic filter cell has the electrical conductor therefor located in the middle of one end wall so that the filter cell may be inverted for the reversal of air flow without changing the position of the electrical conductor relative to the power source to which it is connected.

Figure 10:
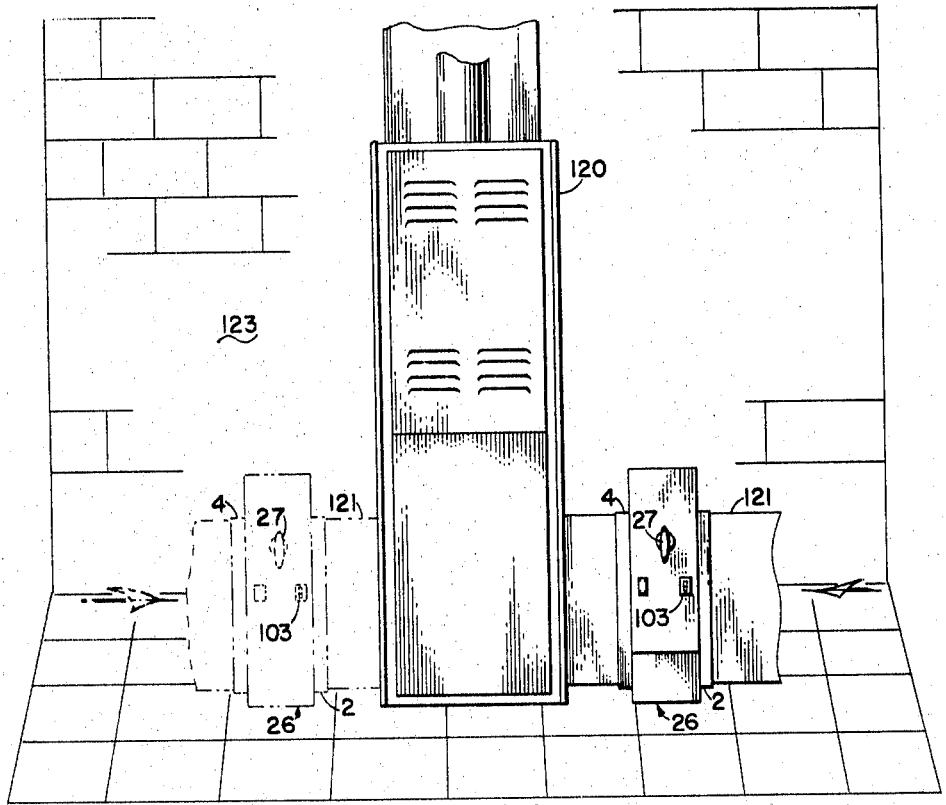
Figure 12:
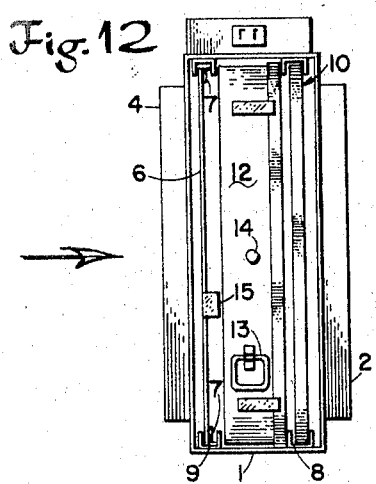
Figure 11:
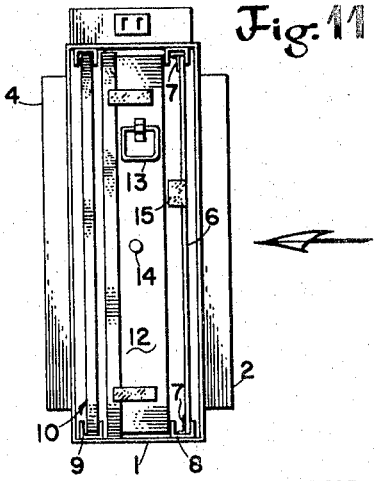

These and other objects and advantages of my invention will become readily apparent as the following description is read in conjunction with the accompanying drawings of which:

FIGURE 1 is a perspective view of the air cleaning apparatus showing the door assembly removed;
FIGURE 2 is a horizontal section view of the air cleaner taken along line 2—2 of FIGURE 1;
FIGURE 3 is a cross-section view of the electrostatic filter cell base frame taken along line 3—3 of FIGURE 8 and showing only the ionizer frame assembly in place in the frame;
FIGURE 4 is a vertical section view of a portion of the ionizing wire assembly taken along line 4—4 of FIGURE 3;
FIGURE 5 is a horizontal section view of the ionizing zone taken along line 5—5 of FIGURE 4;
FIGURE 6 is an exploded perspective view, partially broken away, showing the arrangement of the various components in the air cleaner housing;
FIGURE 7 is a diagrammatic illustration of the electrical circuit for the electrostatic filter cell;
FIGURE 8 is an exploded perspective view of the electrostatic filter cell;
FIGURE 9 is a blown-up perspective view, partially broken away, of one of the insulating corner blocks used to support a charged, grid plate in the filter cell;
FIGURE 10 is a schematic view showing alternative ways of connecting my air cleaner to a furnace duct; and
FIGURES 11 and 12 are end views of the air cleaner with the door removed, showing alternative ways of arranging the internal parts with respect to air flow.

With reference to FIGURES 1, 2 and 6 of the drawings, my improved air cleaner comprises a housing 1 having a flanged air inlet opening 2 in its front face and a flanged air outlet opening 4 in its rear face. Slidably disposed in housing 1 across inlet opening 2 is a wire mesh protective screen 6 which serves to remove relatively large foreign particles from the air stream. A first U-shaped guide channel 8 retains protective screen 6 in position adjacent the front face of housing 1. A second U-shaped guide channel 9 retains slidably removable charcoal pack 10 adjacent the back face of housing 1 across outlet opening 4. Charcoal pack 10 could take the form of any of the several types of charcoal-filled deodorizers commercially available. For illustrative purposes, we have shown a pack comprising a plurality of spaced apart, wire screen channels 11 supported in a frame 17, each of the channels 11 being filled with charcoal pellets. A removable electrostatic filter cell 12 is slidably positioned in housing 1 between guide channes 8 and 9. Filter cell 12 may be pulled out of housing 1 by means of handle 13, most clearly shown in FIGURE 1. An electrical conductor element in the form of brass stud 14 extends through the end wall of filter cell 12 and functions to conduct high voltage direct current to the ionizing and collection zones of the filter cell from an external power source in a manner fully described below.

Located on top of housing 1 is junction box 16 which has knock-out openings 18 in either side (only one of which is shown) through which the lead wires from a 115-volt AC source may be directed. Outlet 24 is provided in one end of junction box 16, and ground connection 22 is located in one side wall. Removable door assembly 26 is provided to close open end 20 of housing 1. Plug 28 on door assembly 26 is adapted to fit into outlet 24 of junction box 16 when the door is put in place, as is most clearly shown in FIGURE 1. Rotatable latch 30 and angle tabs 32 on the inside of door assembly 26 fit into corresponding slots 31 and 33 respectively in the end of housing 1 so as to hold the door securely in place. Latch 30 is operated by handle 27 (shown in FIGURE 10) on the outside of door assembly 26. Box portion 25 of door assembly 26 contains a power pack 35 (FIGURE 7) for converting the alternating current supplied through junction box 16 and plug 28 to high voltage direct current. The high voltage outlet lead from power pack 35 is connected to leaf spring contact 37 in door 26; and spring contact 37 engages brass stud 14 when the door is closed, whereby high voltage direct current is conducted to electrostatic filter cell 12. The complete electrical circuit for my electrostatic air cleaner is described below with reference to FIGURE 7.

Electrostatic filter cell 12 is shown in exploded form in FIGURE 8, and FIGURE 6 illustrates the assembled cell 12 partially broken away. With reference to FIGURE 8, it will be seen that the cell 12 is made up of a frame assembly including a base portion 40 and a top portion 42 removably secured to the base 40 by latches 44 which fasten to catch tabs 46 on top frame 42. An ionizer frame assembly comprised of right angle support members 48 is positioned in base frame 40 with one side of support angles 48 being spot welded to the inside of the front face of frame 40. FIGURE 3, which is a section view of base frame 40 taken along line 3—3 therethrough, shows the vertical sides of top and bottom support angles 48 abutting against the inside face of frame 40. A plurality of parallel metal strips 50 of arcuate cross-section extend between the top and bottom support angles 48, and elongated discharge electrodes 52 are positioned between adjacent strips 50.

The manner in which discharge electrodes 52 are secured within the frame assembly and connected to a high voltage conductor is illustrated in FIGURE 3, 4 and 5 An unitary plastic insulator 74 of U-shaped cross-section rests on top of the top angle support 48 and is provided with a plurality of cap members 76 which extend downwardly through openings in top angle support 48 An aluminum bus strip 72 lies along the lower horizontal portion of plastic insulator 74 Spaced slots 80 (FIGURE 5) in the strip 72 slide over raised retaining shoulders 82 on insulator 74 so as to hold bus strip 72 in place Bus strip 72 is also provided with spaced slots 84 along its back edge which overlie slots 86 in insulator 74 Slots 86 terminate over the center of hollow cap members 76 which are also provided with vertical slots 92 in their front faces. Bottom angle support 48 is also notched to retain insulating caps 88, one of which is shown in section in FIGURE 4. Elongated discharge electrodes 52 are preferably in the form of separate lengths of wire each of which has an intermediate looped portion 90. Each looped wire 52 is slipped through adjacent slots 86–84–92 to a position where its intermediate portion 90 overlies the segment of bus strip 72 between adjacent slots 84 in electrical contact therewith. Raised portions 78 on bus strip 72 between slots 84 prevent the wires 52 from slipping out of position. The lower ends of the open straight portions of each of the looped wires 52 are secured to small crimp sleeves 94 which are retained in the small end of tapered springs 96 positioned within insulating caps 88. Springs 96 maintain tension on looped wires 52 so as to hold them tautly in the proper position.

Top and bottom angle supports 48 and the metal strips 50 retained therebetween are grounded to base frame 40, which is in turn grounded through housing 1 and ground contact 22 thereon. High voltage direct current supplied to bus strip 72 is conducted to looped wires 52 in contact therewith. High voltage wires 52 thus serve as discharge electrodes or ionizers, with the emission of electrons therefrom towards adjacent ground strips 50 establishing an ionization field through which the air to be purified flows.

The looped ionizing wire arrangement shown in FIGURE 4 has the particular advantage that it eliminates the more difficult and expensive contact point type connection between the ends of separate lengths of ionizing wires and the high voltage bus strip. The undesirable electron discharge normally associated with the point type high voltage connections is also obviated. Furthermore, by looping one length of wire over a high voltage contact so as to form two parallel ionizing wires, the number of high voltage connections is cut in half. The use of separate lengths of looped ionizing wires permits continued operation of the unit if one of the wires should break, with only the one broken wire having to be replaced. This is preferable to the use of a single, long wire looped through the ionizing zone, the breakage of which would render the entire ionizing zone inoperative.

With reference again to FIGURE 8, brass conductor stud 14 extends through the end wall of base frame 40 to which handle 13 is attached, and is secured to plastic insulating block 64. Spring contact 66 is fastened to the inner end of brass stud 14, and insulated wire 68 runs from a connection on the side of stud 14 to a point of connection with angle tab 70 on bus strip 72. Positioned on top of the ionizer frame assembly in base frame 40 is a first grounded wire mesh screen 54 spaced from a second grounded screen 62 secured to top frame 42. Between the two ground electrodes 54 and 62 is a charged grid plate 58 having a plurality of openings 61 for the passage of air. Plate 58 is preferably expanded metal and is insulated from and positioned within metal base frame 40 by plastic corner blocks 60. As is clearly shown in FIGURE 9, plastic blocks 60 are each provided with a laterally extending slot 63 in which a corner of grid plate 58 is secured by means of an adhesive coating. Filter media 56 fills the spaces on both sides of plate 58 bounded by wire screens 54 and 62. Media 56 consists of a uniform pad of intermeshed filaments having relatively high electrical resistance and capable of holding a static charge. Fiberglass mats have been found to be quite suitable for this purpose, and are especially desirable because of their low cost.

Screen 54 and one of the filter pads 56 fit under spring contact 66, and when plate 58 is placed in position in base frame 40 it rests upon spring contact 66 in electrical contact therewith, as is best shown in FIGURE 2. Brass stud 14 thus conducts high voltage direct current to grid plate 58 through spring contact 66 as well as to bus strip 72 through conductor 68.

When electrostatic filter cell 12 is removed from housing 1 by handle 13, it can be quickly disassembled by laying it flat on base frame 40 in the position shown in FIGURE 8 and unfastening latches 44. Top frame 42 is then removed so as to permit access to disposable filter pads 56. After the first pad 56 has been inspected and discarded, if full of dust particles, plate 58 and the second filter pad 56 are removed from base frame 40. A clean filter pad 56 may then be installed adjacent screen 54, after which grid plate 58 and a clean top filter pad 56 are placed in position. Top frame 42 is then replaced and fastened to base frame 40 by means of latches 44.

The electrical circuit for my air cleaner is illustrated diagrammatically in FIGURE 7. Plug 28 in door assembly 26 is connected to a 115-volt 60-cycle power supply through outlet 24 in junction box 16 (see FIGURE 1). The leads from plug 28 are connected through on-off switch 103 on the door assembly 26 (shown in FIGURE 9) to the primary winding 101 of step-up transformer 100 contained within a power pack 35. Box portion 25 of door assembly 26 houses power pack 35 and the associated wiring. Condenser 104 is utilized to maintain a substantially constant output voltage from the secondary winding 102 of transformer 100, and this voltage is applied to bridge rectifier 106 which produces a pulsating direct current. Condenser 108 serves to supply a smooth, uniform direct current on the order of 6,000 volts to output terminal 38. The rectifier circuit is grounded at 109. Resistor 110 functions to discharge condenser 108 when the rectifier circuit is de-energized. Spring contactor 37 in door assembly 26 is connected to output terminal 38, and is adapted to come into contact with brass stud 14 when door assembly 26 is secured in place on housing 1 (see FIGURE 1). Conductor 68 and spring contact 66 apply high voltage direct current from brass conductor stud 14 to bus strip 72 and grid plate 58 respectively. A positive charge is thus conducted to ionizing wires 52 through bus strip 72 with which they are in contact. Wire screens 54 and 62 in the electrostatic filter cell are maintained in conductive relationship with ground terminal 22 in junction box 16 by means of frame members 40 and 42 which are in contact with housing 1. Metal strips 50 in the ionizing zone are also grounded through terminal 22 of housing 1 by means of the top and bottom frames 48 between which they are supported.

The operation of my air cleaner will now be readily apparent, with reference to FIGURES 6 and 7. When the circuit shown in FIGURE 7 is energized by closing switch 103 after door assembly 26 is secured to housing 1, an electrostatic field will exist between each of the discharge electrodes or ionizing wires 52 and adjacent ground electrode strips 50 due to the potential difference therebetween. The high voltage direct current applied to grid plate 58 also produces an electrostatic field between plate 58 and grounded screens 54 and 62 on either side thereof. The filaments of filter media 56 positioned in field thus take on an electrostatic charge. Air flowing through the air cleaner in the direction shown by the flow arrow in FIGURE 6 will pass first through protective screen 6 and then flow over ionizing wires 52. As the air flows over ionizing wires 52, the dust particles in the air will be charged by the electrostatic field surrounding each wire. The charged dust particles will then be collected on the oppositely charged filaments of filter media 56 as the air completes its passage through the collection zone of electrostatic filter 12. The final step of purification, i.e., deodorization, takes place as the air discharges from the unit through charcoal containing channels 11.

My improved air cleaner is primarily intended for use in the return air duct leading to a warm air furnace. However, opposed flanged openings 2 and 4 permit the unit to be readily installed in any air duct or in combination with any type of air conditioning unit. It is essential that the air cleaner be installed in such a way that adequate space is available for the removal of door assembly 26 and the internal components including protective screen 6, filter cell 12 and charcoal pack 10. There are many installations where space limitations may require that the door assembly 26 face in a particular direction so as to permit its removal. However, positioning the unit with the door 26 facing in such a direction might, in some cases, result in the air entering what should normally be the outlet side. A furnace installation presenting such a problem is illustrated in FIGURE 10. Furnace 120 is shown with a cold air return duct 121 connected to its right side. My improved air cleaner is positioned in this return duct with flanged openings 2 and 4 coupled to the duct in the manner shown. Since furnace 120 is located so close to wall 123, the air cleaner must be installed in the manner shown with door assembly 26 facing outwardly in order to have space for removing the door 26 and obtaining access to the interior of the air cleaner housing. FIGURE 11 shows the interior of the unit with door assembly 26 removed, lint screen 6, electrostatic filter cell 12 and charcoal pack 10 being arranged in the proper order with respect to air flow through duct 121 into the right side of furnace 120. If, however, return duct 121 came into the left side of the furnace as is illustrated in phantom lines in FIGURE 10, an installation problem would be created. The entire air cleaner could not be turned around with door assembly 26 facing wall 123 to accommodate the air flow from the opposite direction because wall 123 would block access to the door and the internal parts of the unit. The air cleaner obviously must be installed with door assembly 26 facing outwardly from the wall, such an installation being illustrated in phantom lines in FIGURE 10. However, such an arrangement will cause the protective screen 6, filter cell 12 and charcoal pack 10 to be in the wrong order with respect to air flow if these elements remain in the position shown in FIGURE 11. I have incorporated particular features in my air cleaner to overcome this problem. Thus, as may clearly be seen in FIGURE 11, guide channels 8 and 9 for protective screen 6 and charcoal pack 10 respectively are the same size; and protective screen 6 is provided with angle spacers 7 which permit it to fit into the same, larger size guide channel required for charcoal pack 10. Metal tab 15 on protective screen 6 serves as a handle to pull the screen out of housing 1. This arrangement permits protective screen 6 and charcoal pack 10 to be interchangeably positioned in channels 8 and 9. Additionally, brass stud contractor 14 is located in the vertical center of the end wall of electrostatic filter cell 12. Filter cell 12 may thus be inverted 180 degrees to accommodate a reversal of air flow without changing the position of brass stud 14 relative to spring contact 37 in door assembly 26. This feature is best illustrated in FIGURE 1. My air cleaner could thus be easily adapted to properly accommodate the oppositely directed air flow encountered by the phantom-line installation on the left side of furnace 120. The unit could still be installed as shown with door assembly 26 facing outwardly from wall 123 for easy accessibility. It would only be necessary to remove door assembly 26, slide out protective screen 6 and charcoal pack 10 and reposition them in channels 9 and 8 respectively as shown in FIGURE 12. The rearrangement would then be completed by removing electrostatic filter cell 12 from housing 1 and sliding it back in the inverted position shown in FIGURE 12. All of the air cleaner components would then be assembled in the proper order with respect to the air flow shown by the arrow on the left side of furnace 120.

It will be clear from the foregoing description that I have provided an air cleaner having improved features making it especially suitable for small commercial and residential applications. Readily accessible and disposable filter pads 56 make the reconditioning of the unit for continued use after it has collected a large quantity of dust particles a very easy and inexpensive procedure. The unique arrangement of the ionizing zone incorporating ionizing wires 52 looped over bus strip 72 provides a simple construction contributing substantially to the overall low cost of the air cleaner unit. Finally, the reversible air flow feature set forth in conjunction with FIGURES 10, 11 and 12, provides flexibility of installation which is especially important where space limitations are a factor.

Although I have described my improved air cleaner with respect to the particular embodiments shown, I do not intend that my invention be limited thereby. It is contemplated that variations will occur to those skilled in the art which will still be within the spirit and scope of my invention, as defined by the following claims.

I claim:

1. Air cleaning apparatus comprising:
   (a) a frame having an open end and a closed end, said frame having top and bottom closure members and front and back closure members, said front and back closure members having openings for flow of an airstream, the airstream entering through one of said openings, flowing through said frame and exiting through the other of said openings,
   (b) a filter cell removably mounted in said frame, said filter cell comprising a plurality of spaced ionizing wires at the upstream face of said filter cell and a plurality of ground strips spaced between said ionizing wires, a first ground electrode member downstream of said ionizing wires, a first layer of filter media downstream of said first ground electrode, a high voltage electrode member downstream of said first layer of filter media, a second layer of filter media downstream of said high voltage electrode member and a second ground electrode member downstream of said second layer of filter media, said filter cell situated transverse to the flow of said airstream, (c) a lint screen removably mounted in said frame upstream of said filter cell and transverse to the airstream, a charcoal odor removal pack removably mounted in said frame downstream of said filter cell and transverse to the airstream, said lint screen and said charcoal odor removal pack having substantially the same width and being interchangeable with each other, (d) electricity conducting means in electrical communication with said ionizing wires and with said high voltage electrode member and extending to a terminal end, said terminal end extending outward from said open end of said frame and mounted on said filter cell in the vertical center of the side of said filter cell exposed on the open end of said frame, a spring contactor attached to said electricity conducting means and contacting said high voltage electrode member at a point between one of said layers of filter media and said high voltage electrode member.

(e) a door closing the open end of said frame, said door having an opening receiving said terminal end of said conducting means and containing an electrically energized contact engaging said terminal end when said door is in a closing position on said frame, said terminal end so arranged on said filter that it will engage said electrically energized contact on said door when said filter cell is in a first position and when said filter cell is inverted with respect to said first position, said frame further having mounting channels for receiving said lint screen and said odor removal pack, said mounting channels having substantially the same width to effectuate interchangeability of said lint screen and said odor removal pack.

2. The apparatus of claim 1 wherein said ionizing wires are substantially parallel to each other.

References Cited

UNITED STATES PATENTS

| | | | |
|---|---|---|---|
| 1,382,037 | 6/1921 | Welch | 55—151 X |
| 1,926,128 | 9/1933 | Van Steenis. | |
| 2,585,138 | 2/1952 | Landgraf | 55—147 X |
| 2,589,463 | 3/1952 | Warburton | 55—131 |
| 2,650,672 | 9/1953 | Barr et al. | 55—142 X |
| 2,665,770 | 1/1954 | Richardson | 55—145 X |
| 2,813,595 | 11/1957 | Fields | 55—137 |
| 2,868,319 | 1/1959 | Rivers | 55—139 X |
| 2,933,151 | 4/1960 | Kurtz | 55—131 |
| 3,055,159 | 9/1962 | Gonzalez | 55—147 |
| 3,073,094 | 1/1963 | Landgraf et al. | 55—156 X |
| 3,137,550 | 6/1964 | Fruth. | |
| 3,172,747 | 3/1965 | Nodolf | 55—126 X |
| 3,181,285 | 5/1965 | Tepolt et al. | 55—145 X |
| 3,222,848 | 12/1965 | Koble | 55—481 X |
| 3,247,652 | 4/1966 | Annas et al. | 55—481 |
| 3,271,932 | 9/1966 | Newell | 55—132 |

FOREIGN PATENTS

| | | |
|---|---|---|
| 677,658 | 1/1964 | Canada. |
| 980,435 | 12/1950 | France. |
| 1,141,000 | 3/1957 | France. |

HARRY B. THORNTON, *Primary Examiner.*

DENNIS E. TALBERT, JR., *Assistant Examiner.*

U.S. Cl. X.R.

55—129, 131, 138, 139, 146, 151, 155, 316, 318, 147, 481, 485, 486, 490; 339—278